US010447756B2

(12) United States Patent
Kim et al.

(10) Patent No.: US 10,447,756 B2
(45) Date of Patent: Oct. 15, 2019

(54) METHOD AND APPARATUS FOR IMPROVING QUALITY OF EXPERIENCE IN SHARING SCREEN AMONG DEVICES, AND RECORDING MEDIUM THEREOF

(71) Applicant: SAMSUNG ELECTRONICS CO., LTD., Suwon-si (KR)

(72) Inventors: Yong-tae Kim, Suwon-si (KR); Shin-ae Kim, Seoul (KR); Yun-sun Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 14/224,570

(22) Filed: Mar. 25, 2014

(65) Prior Publication Data

US 2014/0289423 A1    Sep. 25, 2014

Related U.S. Application Data

(60) Provisional application No. 61/804,804, filed on Mar. 25, 2013.

(30) Foreign Application Priority Data

Apr. 9, 2013 (KR) .................. 10-2013-0038843

(51) Int. Cl.
*H04L 29/06* (2006.01)
*H04L 12/853* (2013.01)
(Continued)

(52) U.S. Cl.
CPC ............ *H04L 65/80* (2013.01); *G06F 3/1454* (2013.01); *H04L 47/2416* (2013.01);
(Continued)

(58) Field of Classification Search
CPC .. G06F 3/1454; H04L 65/80; H04N 21/41407
(Continued)

(56) References Cited

U.S. PATENT DOCUMENTS 7,743,135 B2    7/2010 Azuma
8,135,263 B2    3/2012 Yogeshwar et al.
(Continued)

FOREIGN PATENT DOCUMENTS

CN    102656551 A    9/2012
JP    2011-19068 A    1/2011
(Continued)

OTHER PUBLICATIONS

Communication dated Jul. 7, 2014 issued by the International Searching Authority in counterpart International Patent Application No. PCT/KR2014/002450.
(Continued)

*Primary Examiner* — June Y Sison
*Assistant Examiner* — Adam A Cooney
(74) *Attorney, Agent, or Firm* — Sughrue Mion, PLLC

(57) ABSTRACT

A method of improving quality of experience (QoE) in a first device which shares a screen of the first device with a second device includes: detecting a class of a content currently displayed on the screen; determining a QoE policy based on the detected class of the content; encoding a screen image of the screen based on the determined QoE policy; and transmitting the encoded screen image to the second device. As such, when a screen is shared among a plurality of devices, optimal QoE may be achieved with respect to each class of a content.

13 Claims, 12 Drawing Sheets

(51) Int. Cl.
  *G06F 3/14* (2006.01)
  *H04N 21/414* (2011.01)
  *H04N 21/4402* (2011.01)
  *H04N 21/442* (2011.01)

(52) U.S. Cl.
  CPC . *H04N 21/41407* (2013.01); *H04N 21/44227* (2013.01); *H04N 21/440263* (2013.01); *H04N 21/440281* (2013.01)

(58) Field of Classification Search
  USPC .................. 709/222, 223, 227, 233, 232
  See application file for complete search history.

(56) References Cited

U.S. PATENT DOCUMENTS

| | | | |
|---|---|---|---|
| 8,868,465 B2 | 10/2014 | Folgner et al. | |
| 9,582,238 B2 | 2/2017 | Rajamani et al. | |
| 2006/0215555 A1 | 9/2006 | Futenma et al. | |
| 2006/0251170 A1* | 11/2006 | Ali | G06T 5/003 375/240.16 |
| 2007/0297669 A1* | 12/2007 | Neal | G06K 9/00456 382/168 |
| 2008/0052414 A1* | 2/2008 | Panigrahi | H04N 21/23439 709/246 |
| 2008/0137954 A1* | 6/2008 | Tang | G06K 9/00456 382/176 |
| 2008/0235747 A1 | 9/2008 | Choi | |
| 2009/0087016 A1* | 4/2009 | Berestov | G06K 9/00664 382/100 |
| 2010/0303296 A1* | 12/2010 | Hattori | H04N 19/15 382/103 |
| 2011/0141123 A1 | 6/2011 | Kumar et al. | |
| 2011/0173256 A1 | 7/2011 | Khalatian | |
| 2012/0131446 A1* | 5/2012 | Park | G06F 17/30905 715/238 |
| 2012/0133727 A1* | 5/2012 | Bolduc | H04N 7/152 348/14.07 |
| 2012/0167122 A1* | 6/2012 | Koskimies | G06F 9/5027 719/328 |
| 2012/0173622 A1 | 7/2012 | Toledano et al. | |
| 2012/0191784 A1 | 7/2012 | Lee et al. | |
| 2012/0284650 A1 | 11/2012 | Chang et al. | |
| 2012/0311043 A1* | 12/2012 | Chen | H04N 21/23406 709/204 |
| 2013/0275578 A1* | 10/2013 | Williams | H04L 43/0882 709/224 |
| 2013/0304934 A1* | 11/2013 | Joch | H04L 65/607 709/231 |
| 2013/0318253 A1* | 11/2013 | Kordasiewicz | H04L 65/80 709/231 |
| 2014/0063177 A1* | 3/2014 | Tian | H04N 7/15 348/14.07 |

FOREIGN PATENT DOCUMENTS

| | | |
|---|---|---|
| KR | 10-2007-0041199 A | 4/2007 |
| KR | 10-2008-0091219 A | 10/2008 |
| KR | 10-2009-0059303 A | 6/2009 |
| KR | 10-2012-0079454 A | 7/2012 |

OTHER PUBLICATIONS

Communication dated Jul. 28, 2014 issued by the European Patent Office in counterpart European Patent Application No. 14161452.9.
Omer Boyaci et al.; "BASS Application Sharing System"; Multimedia; Tenth IEEE International Symposium on IEEE; dated Dec. 15, 2008; 8 pages; XP031535111.
Communication dated Nov. 16, 2017, issued by The State Intellectual Property Office of P.R. China in counterpart Chinese Application No. 201410114580.7.
Communication dated Oct. 14, 2018 issued by the Korean Intellectual Property Office in counterpart Korean Application No. 10-2013-0038843.

* cited by examiner

FIG. 4A
FIG. 4B
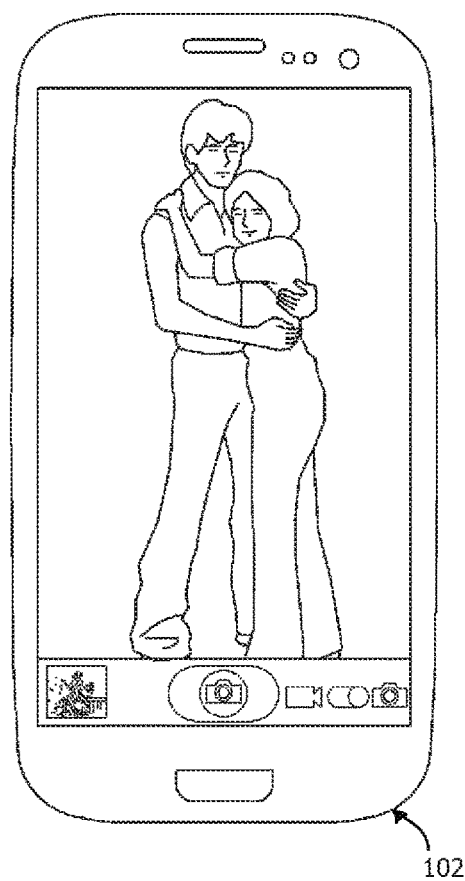
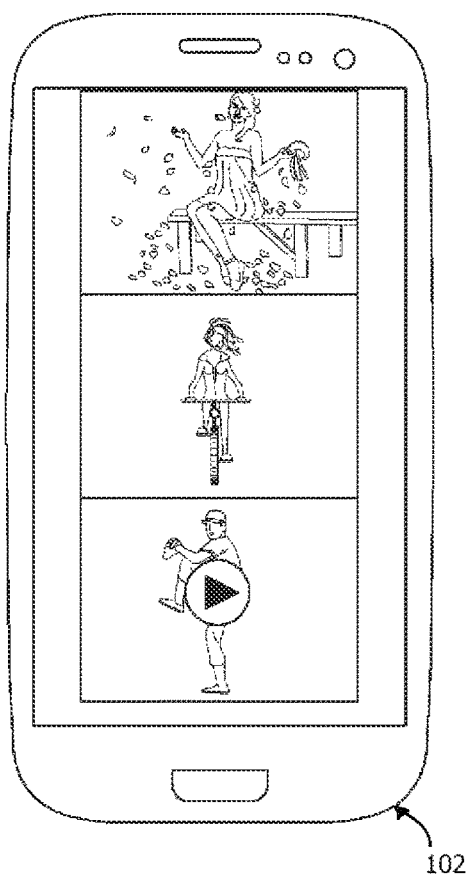

FIG. 5

```
ActivityManager actMng =
(ActivityManager)context.getSystemService     — 502
(ContextACTIVITY_SERVICE);
List<RUNNINGAPPPROCESSINFO>list=
actVing.getRunningAppProcesses();             — 504
```

FIG. 6

| Class | | SOLUTION | FPS | RESOLUTION | App |
|---|---|---|---|---|---|
| GRAPHIC | GRAPHIC_SMALLMOTION | • A graphic image needs a low bitrate in comparison to a real image.<br>• A frame rate should be maintained high. | 5_30 | VGA~QVGA | Most Apps such as a main screen |
| | GRAPHIC_LARGEMOTION | • If the amount of motion is small, human eyes less recognize image quality deterioration.<br>• A representative example is a game application, and a frame rate should be maintained high. | 5_30 | VGA~QVGA | Game, S Memo |
| REAL | REAL_SMALLMOTION | • In case of a gallery application, a low frame rate is allowable. | 5_30 | VGA~QVGA | Gallery |
| | REAL_LARGEMOTION | • A general video QoE policy is used. | 5_30 | VGA~QVGA | Camera/player |
| TEXT_SMALLMOTION | | • In a text content, priority is given to readability.<br>• A policy for setting a resolution to be high in comparison to a frame rate is needed. | 1_15 | HD~VGA | Email/Web/Map |

METHOD AND APPARATUS FOR IMPROVING QUALITY OF EXPERIENCE IN SHARING SCREEN AMONG DEVICES, AND RECORDING MEDIUM THEREOF

CROSS-REFERENCE TO RELATED APPLICATION(S)

This application claims priority from U.S. Provisional Patent Application No. 61/804,804, filed on Mar. 25, 2013 in the U.S. Patent and Trademark Office, and Korean Patent Application No. 10-2013-0038843, filed on Apr. 9, 2013 in the Korean Intellectual Property Office, the disclosures of which are incorporated herein by reference in their entirety.

BACKGROUND

1. Field

Methods and apparatuses consistent with exemplary embodiments relate to sharing screen data among a plurality of devices via a network.

2. Description of the Related Art

When a plurality of devices share a screen, a bitrate of a stream for sharing the screen is determined in consideration of a state of a network. A stream having a high bitrate may be transmitted if the network is unloaded, and a stream having a low bitrate may be transmitted if the network is loaded or congested.

However, since the above method of the related art considers only the state of the network, a screen image of the shared screen may be interrupted or may be reduced in resolution.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a method and apparatus capable of improving quality of experience (QoE) when transmitting screen data, in consideration of a class of a content currently displayed on a screen shared among a plurality of devices.

According to an aspect of an exemplary embodiment, there is provided a method of improving quality of experience (QoE) in a first device which shares a screen of the first device with a second device including: detecting a class of a content currently displayed on the screen; determining a QoE policy based on the detected class of the content; encoding a screen image of the screen based on the determined QoE policy; and transmitting the encoded screen image to the second device.

The encoding may be performed by using a frame rate and resolution which are adjusted based on the determined QoE policy.

The QoE policy may adjust the frame rate to be high, in response to the content having a large amount of motion.

The detected class of the content may be at least one from among a graphic content, a real image content, and a text content. The detecting may be performed based on a name of a currently executed application.

The determining may include, in response to a plurality of classes of contents being currently displayed on the screen, selecting a QoE policy corresponding to a class of a content having a highest priority based on priorities previously set with respect to the plurality of classes of the contents.

The encoding may include determining an allowable bitrate based on a state of a network used to share the screen among the first device and the second device; and adjusting a frame rate and resolution used to encode the screen image of the screen, based on the determined bitrate.

According to an aspect of another exemplary embodiment, there is provided a transmission device including: a memory configured to store at least one program; and a processor configured to enable the transmission device to share sharing a screen of the transmission device with a receiving device, and improve quality of experience (QoE), by executing the at least one program, wherein the at least one program executes a method including: detecting a class of a content currently displayed on the screen; determining a QoE policy based on the detected class of the content; encoding a screen image of the screen based on the determined QoE policy; and transmitting the encoded screen image to the receiving device.

The encoding may be performed by using a frame rate and resolution which are adjusted based on the determined QoE policy.

The QoE policy may adjust the frame rate to be high, in response to the content having a large amount of motion.

The detected class of the content may be at least one from among a graphic content, a real image content, and a text content. The detecting may be performed based on a name of a currently executed application.

The determining may include, in response to a plurality of classes of contents being currently displayed on the screen, selecting a QoE policy corresponding to a class of a content having a highest priority based on priorities previously set with respect to the plurality of classes of the contents.

The encoding may include: determining an allowable bitrate based on a state of a network used to share the screen among the transmission device and the receiving device; and adjusting a frame rate and resolution used to encode the screen image of the screen, based on the determined bitrate.

According to an aspect of another exemplary embodiment, there is provided a computer-readable recording medium have embodied thereon a computer program for executing the method for improving the QoE in the first device.

According to an aspect of another exemplary embodiment, there is provided a transmission device including: a display configured to display a screen image; and a controller configured to determine a state of a network used to share the screen image, determine a QoE policy corresponding to a content of the screen image which is currently displayed, determine a frame rate and a frame resolution based on the determined QoE policy and the determined state of the network, encode the screen image according to the determined frame rate and the determined frame resolution, and transmit the encoded screen image to a receiving device using the network.

The controller may be further configured to determine the QoE policy by determining a class of the content of the screen image.

The controller may be further configured to determine the QoE policy by determining an amount of motion of the content of the screen image.

The controller may be further configured to determine the state of the network by determining a maximum bitrate for transmitting the encoded image.

According to an aspect of another exemplary embodiment, there is provided a method of improving quality of experience (QoE) when sharing a screen between a transmitting device and a receiving device, the method including: determining a state of a network used to share the screen; determining a QoE policy corresponding to a content of an image currently displayed on a screen of the transmitting device; determining a frame rate and a frame resolution based on the determined QoE policy and the determined state of the network; encoding the image according to the determined frame rate and the determined frame resolution; and transmitting the encoded image to the receiving device using the network.

The determining the QoE policy may include determining a class of the content of the image.

The determining the QoE policy may further include determining an amount of motion of the content of the image.

The determining the state of the network may include determining a maximum bitrate for transmitting the encoded image.

According to an aspect of another exemplary embodiment, there is provided a non-transitory computer readable medium having embodied thereon a program executable by a computer for performing the method of improving the QoE when sharing a screen.

BRIEF DESCRIPTION OF THE DRAWINGS

The above and/or other aspects will become apparent and more readily appreciated from the following description of certain exemplary embodiments, taken in conjunction with the accompanying drawings, in which:

FIGS. 4A and 4B are is views of a real image content that QoE policies are applied to, according to an exemplary embodiment;

FIG. 5 is a flowchart of a method of detecting a class of a content, according to an exemplary embodiment;

FIG. 6 is a table showing QoE policies based on classes of contents, according to an exemplary embodiment;

DETAILED DESCRIPTION OF EXEMPLARY EMBODIMENTS

Figure 1:
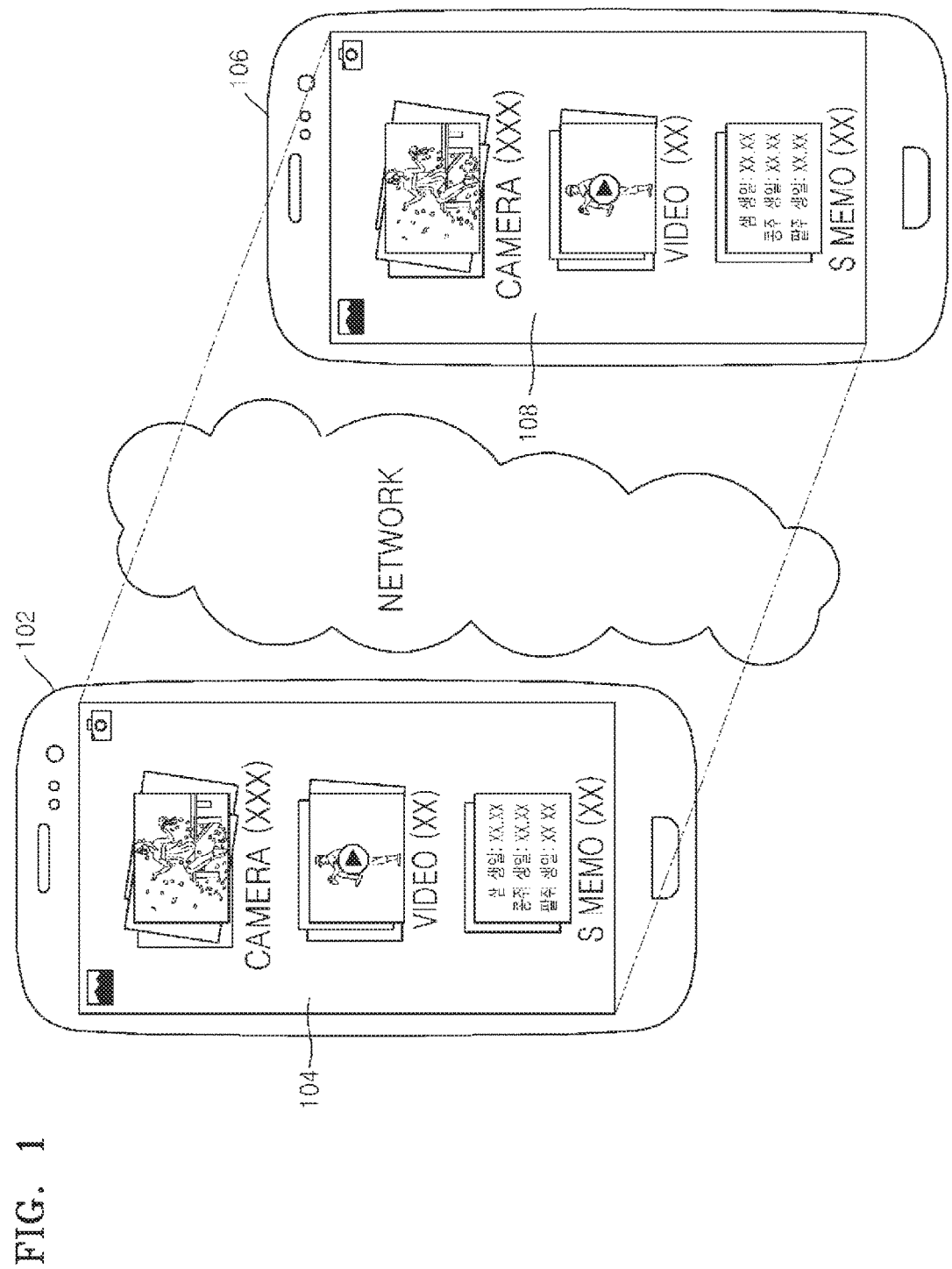
FIG. 1 is a conceptual view for describing sharing of a screen among a plurality of devices, according to an exemplary embodiment.

Certain exemplary embodiments will now be described in greater detail with reference to the accompanying drawings.

In the following description, like reference numerals refer to the like elements throughout, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a conceptual view for describing sharing of a screen among a plurality of devices, according to an exemplary embodiment. In the following description, a transmission device 102 refers to a device for transmitting a screen image of the shared screen, and a reception device 106 refers to a device for receiving the screen image. A device may be embodied as, for example, a personal computer (PC), a smartphone, and a tablet PC.

The transmission device 102 transmits, via a network, a screen image 104, which is currently displayed on the screen of the transmission device 102, to the reception device 106. For example, if a gallery application is being executed in the transmission device 102, a list of photos may be currently displayed as the screen image 104 of the transmission device 102. If the screen is shared, the transmission device 102 may capture and transmit, via the network, the screen image 104 to the reception device 106.

If the reception device 106 receives the captured screen image 104, the reception device 106 may display a screen image 108 that is the same as the screen image 104 displayed on the transmission device 102, thereby sharing the same screen.

When the transmission device 102 transmits the screen image 104, a state of the network needs to be considered because an allowable bitrate to transmit the screen image 104 is determined based on the state of the network. However, in addition to the state of the network, quality of experience (QoE) also needs to be considered. The QoE refers to an overall experience or tolerance of a service user when the service user is viewing an application or service on a shared screen.

For example, in case of a map application, when the map application is executed, a screen image generally has no motion or has simple motion based on scrolling. On the other hand, the map application gives priority to readability. Accordingly, when a screen for executing the map application is shared, if an allowable bitrate is determined by analyzing the state of the network, a resolution (e.g., a frame resolution) is set to be high within a range of the determined allowable bitrate in comparison to a frame rate.

Even when the state of the network is the same and thus the same allowable bitrate is determined, if an application has a large amount of motion, e.g., a game application, a frame rate is set to be high within the range of the determined allowable bitrate in comparison to a resolution.

In other words, even when the allowable bitrate is the same, since desired levels of a resolution and frame rate varies based on characteristics of an application, the QoE needs to be maintained in an optimal state by appropriately adjusting the resolution and frame rate based on the characteristics of each application. Put another way, the bandwidth of the allowable bitrate is allocated between a frame resolution and a frame rate based on characteristics of each application.

Figure 2:
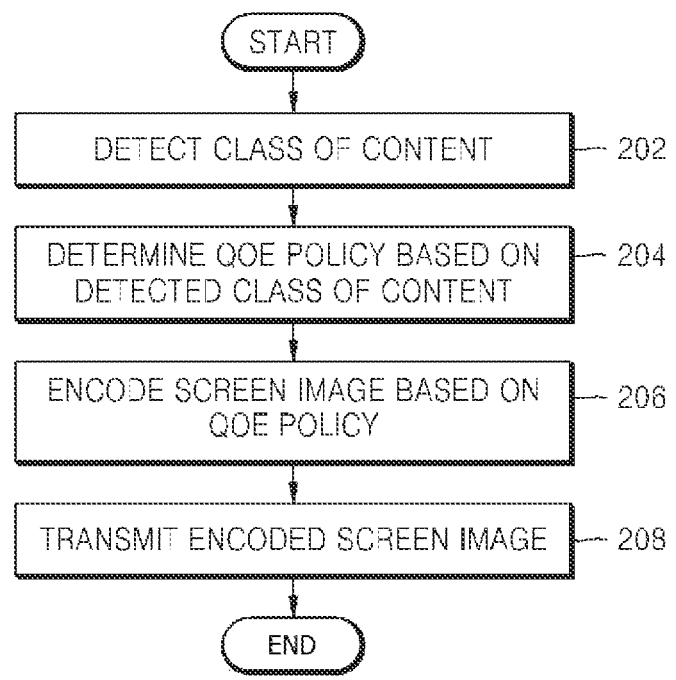
FIG. 2 is a flowchart of a method of improving quality of experience (QoE) based on a class of a content, according to an exemplary embodiment.

FIG. 2 is a flowchart of a method of improving QoE based on the class of a content, according to an exemplary embodiment. The improving of the QoE when a screen is shared among a plurality of devices is performed by a transmission device 102.

In operation 202, the transmission device 102 detects the class of a content of a screen image to be transmitted to a reception device when a screen is shared.

The class of the content may be classified as a graphic content, a real image content, or a text content. Further, an amount of motion in the screen image may also be a condition for classifying the class of the content. In other words, a graphic content may be further classified based on whether the amount of motion in the screen image is high or low. However, the class of the content is not limited thereto. Hereinafter, the class of the content will be described in greater detail by referring to FIGS. 3A-4B.

Figure 3A:
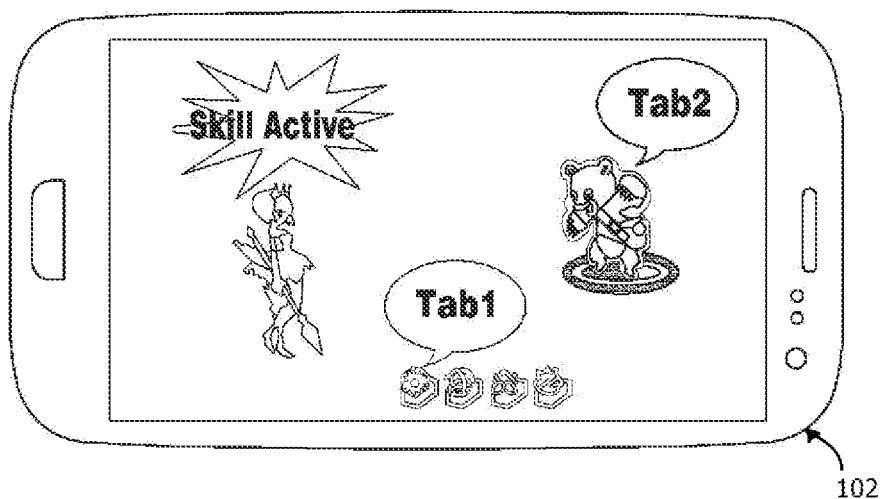
FIGS. 3A and 3B are views of a graphic content and a text content, respectively, that QoE policies are applied to, according to an exemplary embodiment.
Figure 3B:
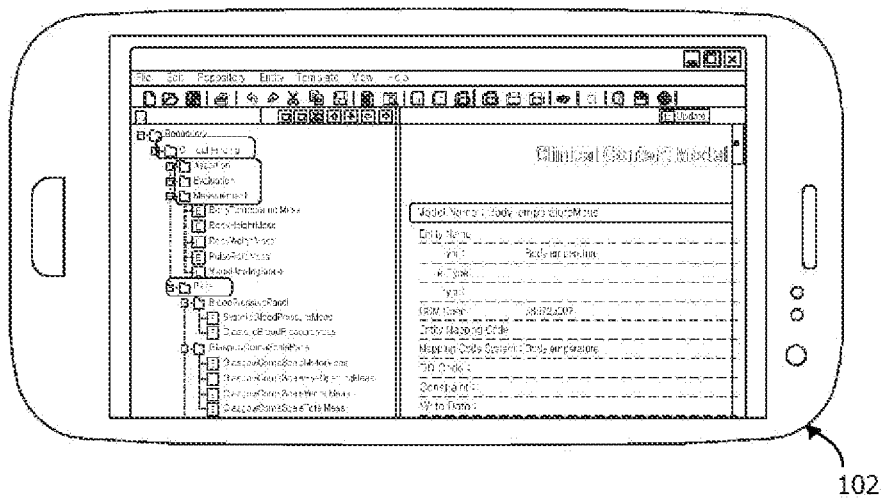

FIGS. 3A and 3B are views of a graphic content and a text content that QoE policies are applied to, according to an exemplary embodiment.

Referring to FIGS. 3A and 3B, screens of the transmission device 102, in which a game application and a web page are being executed, as illustrated as examples of the graphic content and the text content, respectively.

Referring to FIG. 3A, an example of an application corresponding to the graphic content includes a game application. Since the game application has a large amount of motion, in order to maintain QoE in an optimal state, a frame rate may be determined to be high.

Even in the case of the same class of the content (e.g., the graphic content), the QoE policies may be different according to an amount of motion. For example, in the case of the class of the content having a large amount of motion, a frame rate may be determined to be comparatively higher than a resolution, in comparison to the class of the content having a relatively less amount of motion. When the content has a large amount of motion, the transmission device 102 according to an exemplary embodiment may determine the frame rate to be comparatively higher than the resolution, within a range of the allowable bitrate determined based on the state of the network, since it may be relatively hard for a user to recognize image quality deterioration.

For example, if a main screen is being executed in the transmission device 102, each of items displayed as icons on the main screen corresponds to a graphic content, like the game application. However, a screen image of the main screen generally has no motion or has very simple motion. Accordingly, the transmission device 102 may determine a frame rate to be relatively lower and determine a resolution to be relatively higher, when the main screen is executed, in comparison to when the game application is executed.

FIG. 3B illustrates an example of a text content. Referring to FIG. 3B, the example of the text content includes a web page. In the case of the web page, the amount of motion is less than other classes of the content, and readability becomes important. Thus, when the web page is being executed, the transmission device 102 may give priority to the resolution and determine the resolution to be comparatively higher than the frame rate, within the range of the allowable bitrate determined based on the state of the network.

Another example of the text content includes an email application. Since readability is again an important factor for the email application, the transmission device 102 determines the resolution to be comparatively higher than the frame rate, when the email application is being executed.

FIGS. 4A and 4B are views of real image content that QoE policies are applied to, according to an exemplary embodiment.

Referring to FIGS. 4A and 4B, screens of the transmission device 102, in which a camera application and a gallery application are being executed, are illustrated as examples of the real image content.

FIG. 4A illustrates the screen of the transmission device 102, in which the camera application is being executed. The camera application captures moving or still images, and thus has a large amount of motion in a screen image. On the other hand, the gallery application illustrated in FIG. 4B does not have a large amount of motion. Accordingly, a frame rate of the camera application is determined to be higher than the frame rate of the gallery application.

For reference, a resolution of the real image content is generally set to be higher than the resolution of the graphic content. Also, the resolution of the real image content is set to be relatively low compared to the resolution of the text content.

The class of the content currently displayed on the screen may be detected based on the name of an application. Here, the name of the application may refer to every type of identification information capable of identifying an application based on an operating system (OS).

A method of detecting the class of the content by using the name of the application is now described with reference to FIG. 5.

Referring to FIG. 5, a command 502 is input to detect an application currently being executed in a device. If the command 502 is input, names of applications are checked. However, information for detecting the executed application during the checking is not limited to the name of the application.

For example, the information for detecting the application may include header information in a bitstream. In more detail, unique header information of each application in a program of a device is previously set in a memory, and information matched to header information obtained by parsing a bitstream of a screen image of a shared screen is found in the memory. The found application may be determined as an application to be currently displayed on the screen.

The application may also be detected by using water mark information inserted into each frame in order to prevent illegal copies of the application. When water mark information is used, if unique water mark information of each application is previously set, an application to be currently displayed on the screen may be detected by searching for an application matched to the water mark information.

If the currently executed application is checked, a command 504 for detecting a class of a content corresponding to the application is input. Since a list in which types of applications are mapped to classes of contents is stored in the memory, if the currently executed application is checked, the class of the content corresponding to the currently executed application may be found on the list.

A method of mapping types of applications to classes of contents may be based on, for example, an image type such as a graphic image or a real image, or an amount of motion with respect to each application.

Whether the class of the content currently displayed on the screen is a text content may be determined by using a text detection algorithm. The text detection algorithm is not limited to any particular algorithm and various text detection algorithms may be used.

Whether the class of the content currently displayed on the screen is a real image content may be determined based on whether a codec is used. For example, if it is checked via IMOX that a video decoder is used and thus that a real video image is currently displayed on the screen, the class of the content currently displayed on the screen may be detected as a real image content.

The class of the content may also be detected by using a motion vector of the content currently displayed on the screen. Ranges are set, and then classes of contents are mapped based on the set ranges. If the motion vector of the content currently displayed on the screen corresponds to a set range, a class of a content mapped to the set range may be detected as the class of the content currently displayed on the screen.

The class of the content may be detected by using a sum of motion vectors together with a text detection algorithm. Ratio information of text on the screen may be obtained by using a text detection algorithm and then a class of a content based on a sum of motion vectors may be further classified based on a resolution.

In more detail, if a ratio of text on the screen is less than a previously set certain value, a weight of a resolution is reduced. Otherwise, if the ratio of text is equal to or greater than the certain value, the weight of the resolution is increased. As such, the weight used to determine the resolution may be differently set.

In operation 204, the transmission device determines a QoE policy based on the detected class of the content. If a currently allowable bitrate is determined by analyzing the state of the network, the QoE policy is used to adjust the resolution and frame rate based on the class of the content within a range of the allowable bitrate. A method of determining the allowable bitrate by analyzing the state of the network will be described below with reference to FIG. 6.

In operation 206, the transmission device encodes the screen image currently displayed on the screen, based on the determined QoE policy. For example, if a game application is currently displayed on the screen, since the game application is a graphic content and has a large amount of motion and thus a user less recognizes image quality deterioration, a frame rate is set to be high.

In operation 208, the transmission device transmits the encoded screen image to the reception device. There may be one or more reception devices.

FIG. 6 is a table showing QoE policies based on the classes of contents, according to an exemplary embodiment.

If the class of a content currently displayed on a screen is a graphic content or a real image content, a resolution may be VGA or QVGA, and a frame rate may be variably changed between 5 frames per second (fps) and 30 fps. Otherwise, if the class of the content currently displayed on the screen is a text content, the resolution may be HD or VGA, and the frame rate may be variably changed between 1 fps and 15 fps.

The frame rate may be set to be the highest with respect to the graphic content having a large amount of motion and thus having a small amount of image quality deterioration, and the resolution may be set to be the highest with respect to the text content having readability as a top-priority factor. Here, the settings of the frame rate and the resolution are not limited thereto.

For example, when a state of a network is analyzed and an allowable bitrate of a stream is 100 kilobits per second (kbps), if the class of the content currently displayed on the screen is the graphic content, the frame rate may be set as 15 fps. If the class of the content is the real image content, the frame rate may be set as 10 fps. If the class of the content is the text content, the frame rate may be set as 1 fps.

Since an allowable bitrate is changed based on a state of a network, a frame rate and resolution are also changed based on the changed bitrate. For example, if the allowable bitrate is increased, a ratio of increasing the frame rate based on the increased allowable bitrate may be set differently with respect to each class of a content.

In more detail, a bitrate required to increase a frame rate by 1 fps may be set as 10 kbps with respect to a graphic content, 15 kpbs with respect to a real image content, and 30 kbps with respect to a text content.

For example, it is assumed that, when an allowable bitrate of a stream is 100 kbps, a frame rate of a graphic content is 15 fps, a frame rate of a real image content is 10 fps, and a frame rate of a text content is 1 fps. If the allowable bitrate is increased to 280 kbps based on a changed state of a network, a frame rate of the graphic content is increased to 33 fps, a frame rate of the real image content is increased to 26 fps, and a frame rate of the text content is increased to 7 fps.

The class of the content currently displayed on the screen may be further classified based on an amount of motion. For example, a graphic content may be further classified into a graphic content having a small amount of motion or a graphic content having a large amount of motion. Also, a real image content may be further classified into a real image content having a small amount of motion or a real image content having a large amount of motion. A text content has no motion or has a very small amount of motion, and thus is not further classified based on an amount of motion.

As the QoE policy is based on the class of the content, a graphic content having a small amount of motion (GRAPHIC_SMALLMOTION) may be set to have a high frame rate, and a low resolution in comparison to a real image content or a text content. An example of an application corresponding to the graphic content having a small amount of motion includes a main screen of a device.

Since image quality deterioration in a content having a large amount of motion may not be easily recognized by a user, a graphic content having a large amount of motion (GRAPHIC_LARGEMOTION) may be maintained at a high frame rate in comparison to a resolution. An example of an application corresponding to the graphic content having a large amount of motion includes a game application.

An example of an application corresponding to a real image content having a small amount of motion (REAL_SMALLMOTION) includes a gallery application. A content having a small amount of motion generally has no motion or has simple motion, and thus may be set to have a high resolution in comparison to a frame rate.

Since image quality deterioration in a content having a large amount of motion may not be easily recognized by a user, a real image content having a large amount of motion (REAL_LARGEMOTION) may be set to have a high frame rate in comparison to a resolution. In this case, the resolution is generally set to be high in comparison to that of a graphic content.

A text content (TEXT_SMALLMOTION) gives priority to readability and thus may be set to have a high resolution in comparison to a frame rate. Examples of an application corresponding to the text content include an email application, a web page, and a map application.

Figure 7:
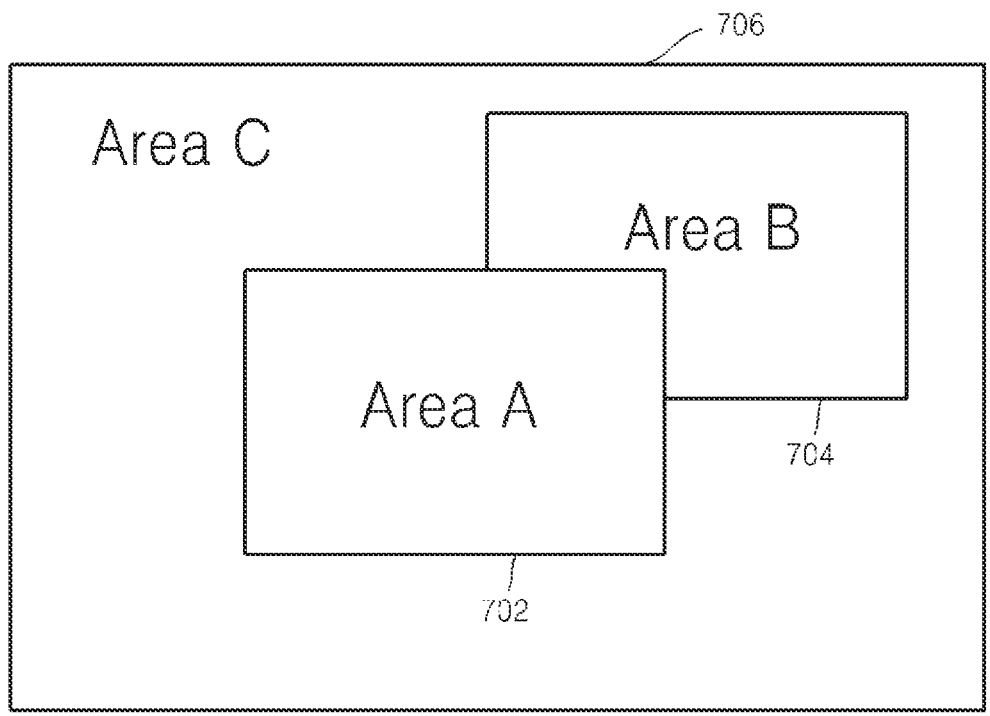
FIG. 7 shows a screen on which a plurality of classes of contents exist, according to an exemplary embodiment.

FIG. 7 shows a screen on which a plurality of classes of contents exist, according to an exemplary embodiment. If a plurality of classes of contents exist on the screen, a QoE policy corresponding to a class of a content having the highest priority from among priorities previously set with respect to a graphic content, a real image content, and a text content may be determined.

For example, referring to FIG. 7, an area A 702 corresponds to a real image content, an area B 704 corresponds to a text content, and an area C 706 corresponds to a graphic content. If the previously set priorities are given in the order of a real image content, a graphic content, and a text content, a QoE policy appropriate to the real image content is determined and then a parameter used to encode a screen image currently displayed on the screen is adjusted based on the determined QoE policy.

If a plurality of classes of contents exist on the screen, the QoE policy may be determined according to a ratio of each class of a content that exists on the screen. For example, referring to FIG. 7, since a ratio of the area C 706 corresponding to a graphic content is the highest on the screen, a QoE policy appropriate to the graphic content is determined and then a parameter used to encode the screen image currently displayed on the screen is adjusted based on the determined QoE policy.

A condition for determining a QoE policy when a plurality of classes of contents exist is not limited to the previously set priority and the ratio of each class of a content on the screen.

Figure 8:
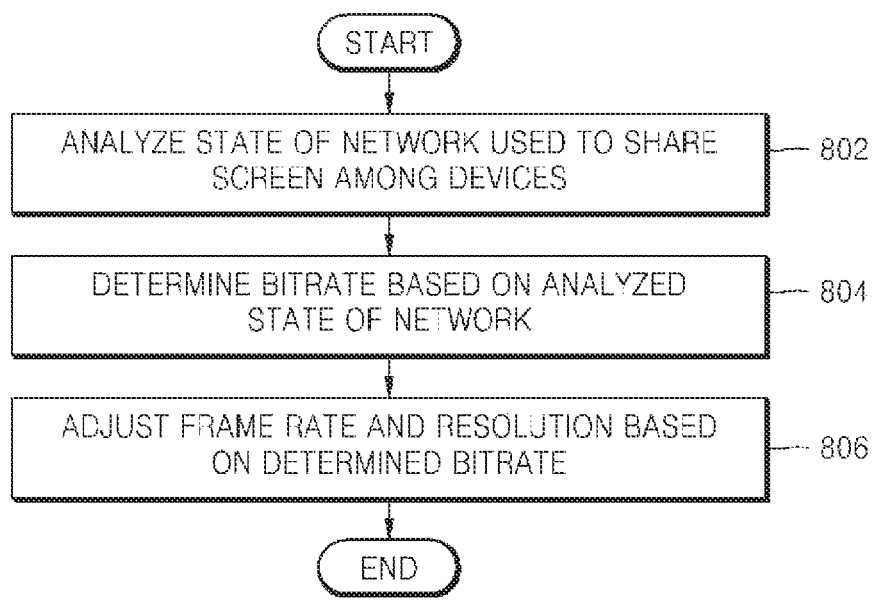
FIG. 8 is a flowchart of a method of improving QoE by analyzing a state of a network, according to an exemplary embodiment.

FIG. 8 is a flowchart of a method of improving QoE by analyzing a state of a network, according to an exemplary embodiment.

In operation 802, a transmission device analyzes a state of a network used to share a screen among a plurality of devices. For example, a real-time transport control protocol (RTCP) is used to analyze the state of the network. The RTCP monitors the network based on data obtained by transmitting a cyclical control packet to a device that participates in transmission and reception of a stream via the network. In particular, the RTCP is used to collect information about a reception device and to calculate a transmission rate of the reception device.

The state of the network may be classified into an unloaded state in which transmission and reception of streams are appropriately performed, a loaded state in which a load to transmission and reception of streams starts to be generated, and a congested state in which a packet loss starts to occur.

The state of the network may be analyzed by analyzing a current state of the network and recent n states of the network. The recent n states of the network may be obtained by reading the states of the network stored in a buffer for a certain period of time.

In operation 804, the transmission device determines an allowable bitrate to transmit a stream, based on the analyzed state of the network.

In operation 806, the transmission device adjusts a frame rate and resolution based on the allowable bitrate determined in operation 804. In more detail, if the allowable bitrate is determined based on the analyzed state of the network, a QoE policy appropriate to a class of a content currently displayed on the screen may be determined based on the determined allowable bitrate. The frame rate and resolution are adjusted based on the determined QoE policy.

For example, the transmission device starts to transmit a screen image of the screen to be shared, to a reception device at a point of time t. It is assumed that, at the point of time t, the state of the network is a loaded state and the allowable bitrate is 100 kbps. An application currently displayed on the screen is a game application that is a graphic content having a large amount of motion.

At a point of time when n states of the network are completely analyzed from the point of time t, it is assumed that the state of the network analyzed by analyzing a current state of the network and the n states of the network is an unloaded state and the allowable bitrate is 280 kbps. Since the allowable bitrate is increased, the frame rate and resolution used to encode the screen image of the screen are changed.

The application currently displayed on the screen is a game application, and the frame rate has to be maintained high in comparison to the resolution. In case of a graphic content, if it is assumed that a bitrate required to increase the frame rate by 1 fps is 10 kbps, the frame rate of the currently displayed screen image is increased by 18 fps.

Figure 9:
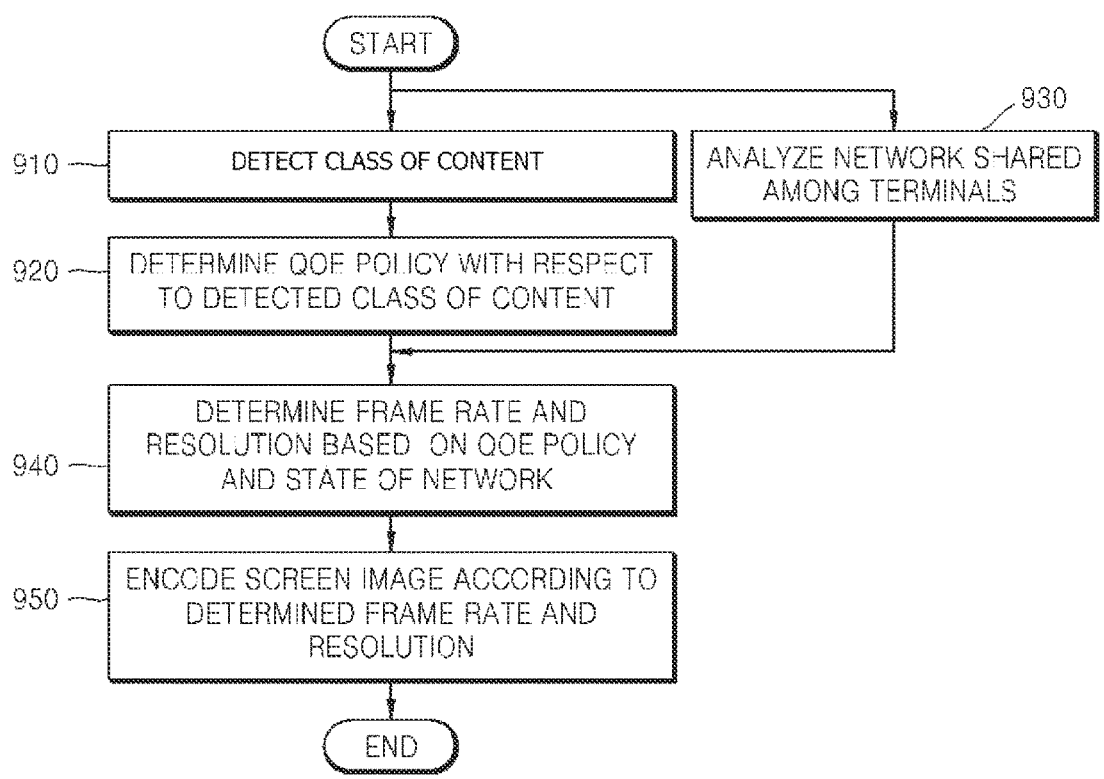
FIG. 9 is a flowchart of a method of improving QoE based on a class of a content and a state of a network, according to an exemplary embodiment.

FIG. 9 is a flowchart of a method of improving QoE based on a class of a content and a state of a network, according to an exemplary embodiment.

In operation 910, the transmission device detects the class of the content on a screen image to be transmitted to a reception device when a screen is shared.

The class of the content may be classified as a graphic content, a real image content, or a text content. Also, an amount of motion in the screen image may be a condition for classifying the class of the content. In other words, a graphic content may be further classified based on whether the amount of motion in the screen image is high or low.

In operation 920, the transmission device determines a QoE policy based on the detected class of the content. For example, the transmission device applies QoE policies predetermined for each of the class of the content, that is, the graphic content, the real image content, or the text content, to the content executed in the screen of the transmission device. Hereinafter, the QoE policy when content is displayed in a TV terminal, according to an exemplary embodiment, will be described by referring to FIGS. 10A-11B.

Figure 10A:
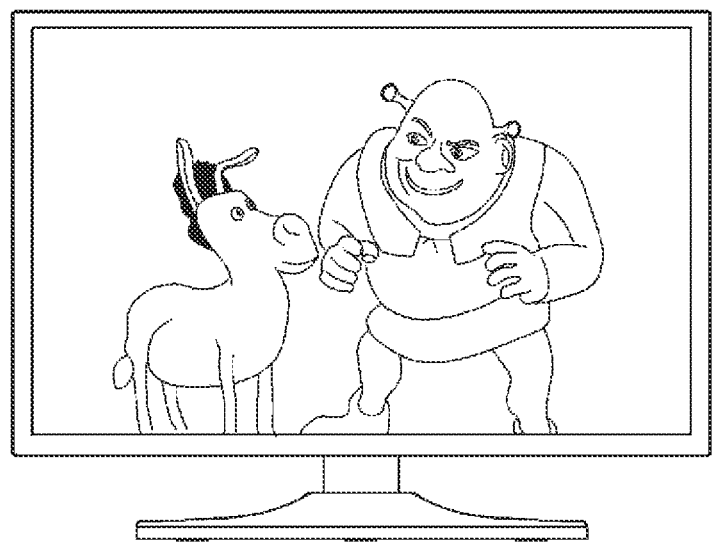
FIGS. 10A and 10B are views of a graphic content and a text content that QoE policies are applied to, according to another exemplary embodiment.
Figure 10B:
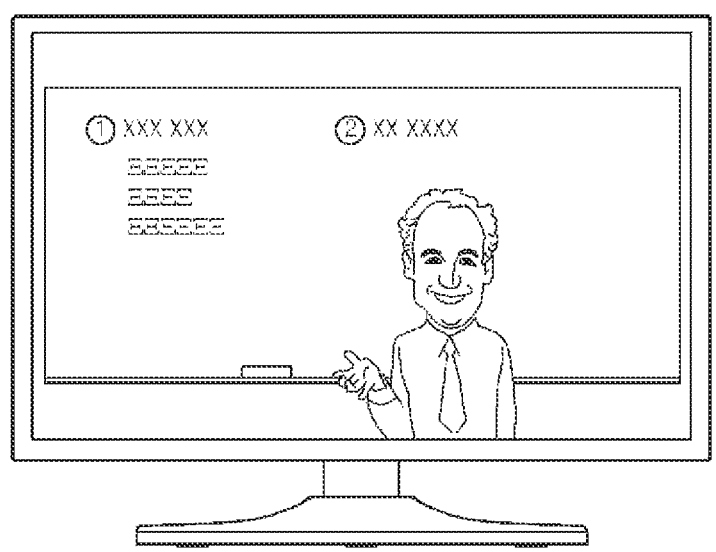

FIGS. 10A and 10B are views of a graphic content and a text content that QoE policies are applied to, according to another exemplary embodiment. FIG. 10A illustrates a screen of a TV terminal in which the graphic content is displayed, and FIG. 10B illustrates a screen of a TV terminal in which the text content is displayed.

Referring to FIG. 10A, an example of the graphic content may include an animation movie. In the case of the class of the content having a large amount of motion, a frame rate may be determined to be comparatively higher than a resolution, compared to the class of the content having a less amount of motion. When the animation film is executed in the TV terminal, images displayed in the TV terminal has a large amount of motion, and thus, the frame rate is determined to be high, in order to improve the QoE.

FIG. 10B illustrates an example of the text content. Referring to FIG. 10B, an example of the text content may include an educational application. In the case of the educational application, content of a teaching material is written as a text so that the amount of motion is less than other classes of content and readability becomes an important factor. Accordingly, when the educational application is executed in the TV terminal, priority may be given to the resolution, and the resolution may be determined to be comparatively higher than the frame rate, within a range of an allowable bitrate that is set based on a state of a network.

Figure 11A:
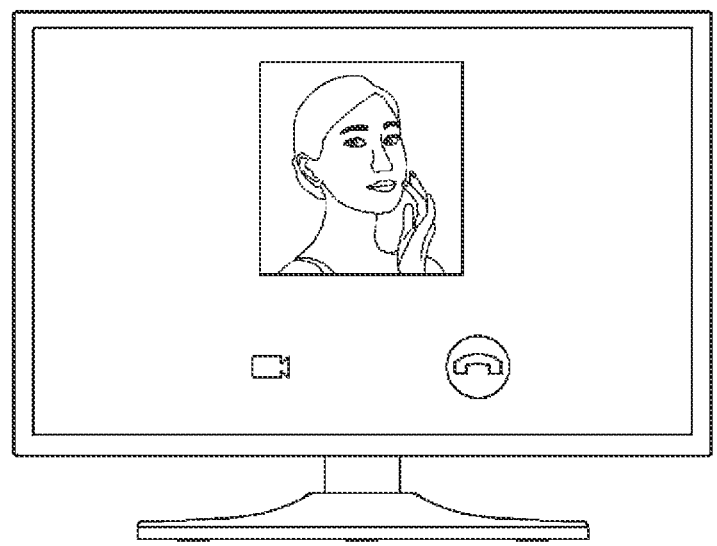
FIGS. 11A and 11B are views of real image content that QoE policies are applied to, according to another exemplary embodiment.
Figure 11B:
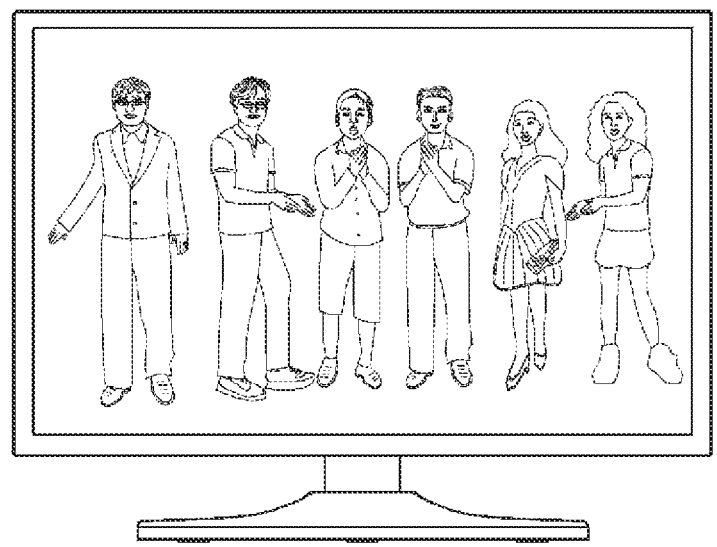

FIGS. 11A and 11B are views of real image content that QoE policies are applied to, according to another exemplary embodiment. Referring to FIGS. 11A and 11B, screens of a TV terminal, in which a phone application and a gallery application, as examples of the real image content, are being executed, are illustrated.

FIG. 11A illustrates the screen of the TV terminal, in which the phone application is being executed. In the case of the phone application, there is a large amount of motion, since image data or sound data should be transmitted and received in real time during a phone call. On the other hand, although the gallery application illustrated in FIG. 11B is included in the real image content as the phone application, there is a small amount of motion compared to the phone application. Accordingly, a frame rate of the phone application is determined to be higher than a frame rate of the gallery application.

Referring again to FIG. 9, in operation 930, the transmission device analyzes a state of a network among a plurality of terminal devices sharing the screen. The transmission device determines an allowable bitrate of a stream transmission, based on an analysis result of the state of the network. An example of a method of the analysis of the state of the network may include RTCP.

The transmission device determines a frame rate and a resolution based on the determined QoE policy and the state of the network, in operation 940. For example, when, as a result of the analysis of the state of the network, the allowable bitrate is 1000 kbps, the transmission device may determine the frame rate and the resolution of the content displayed in the screen within a bitrate of 1000 kbps. When the class of the content is the graphic content and the content having a large amount of motion, the transmission device may determine the frame rate to be comparatively higher than the resolution within the bitrate of 1000 kbps.

The transmission device encodes the screen image according to the determined frame rate and resolution in operation 950. Operation 950 may correspond to operation 206.

The transmission device transmits the encoded screen image to a reception device. The reception device according to an exemplary embodiment may be one or more.

Figure 12:
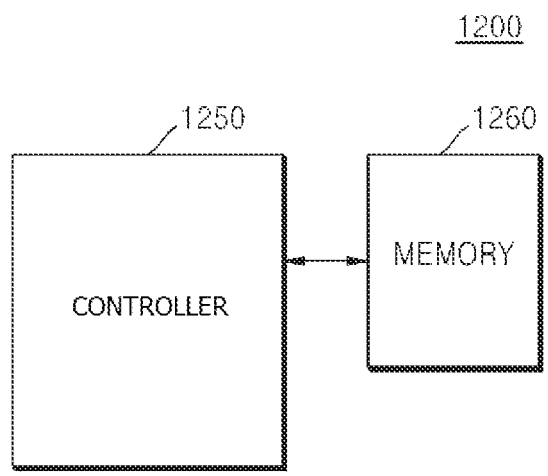
FIGS. 12 and 13 are block diagrams of a device for improving QoE of a screen shared among a plurality of devices, according to an exemplary embodiment.
Figure 13:
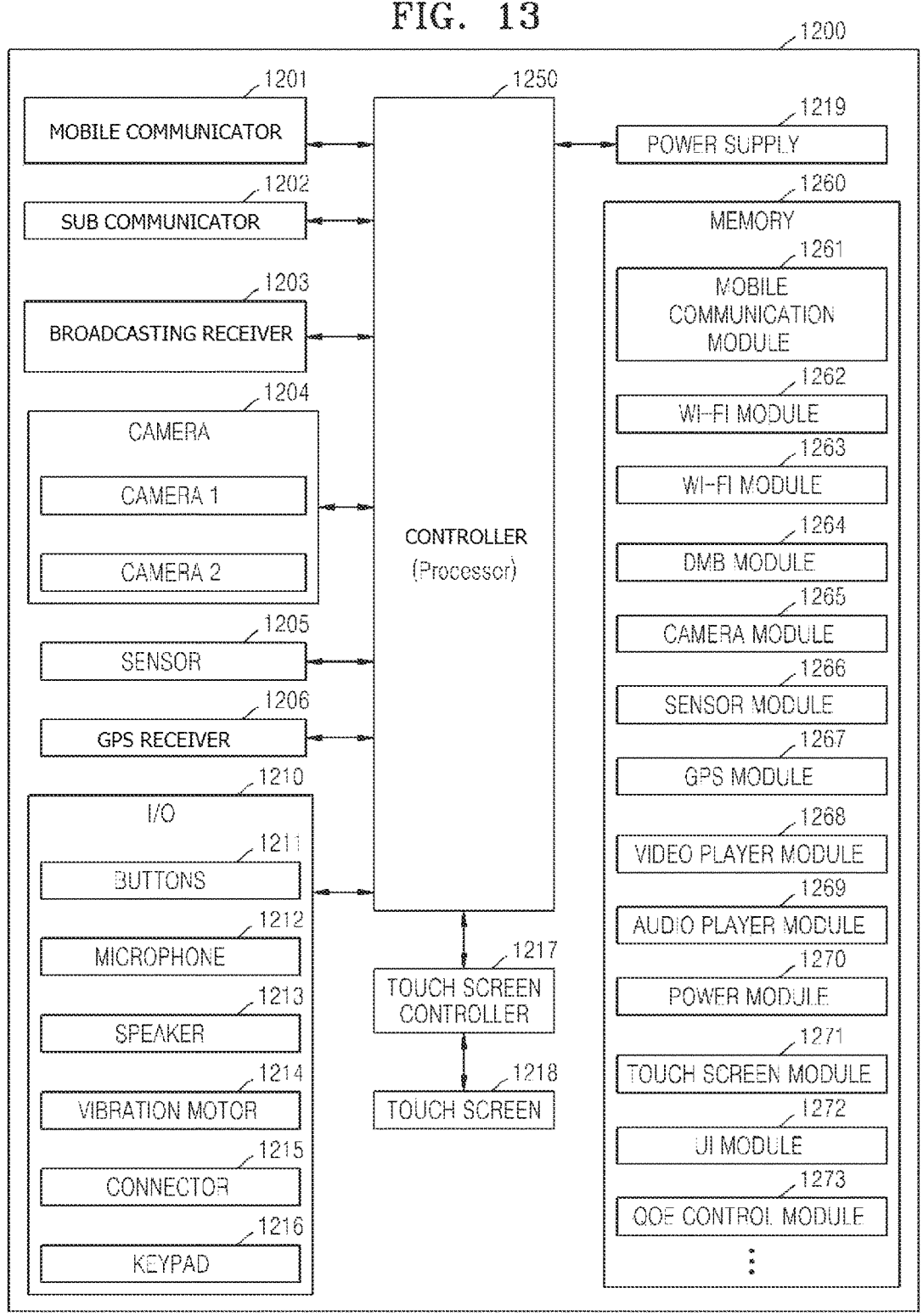

FIGS. 12 and 13 are block diagrams of a device 1200 for improving QoE of a screen shared among a plurality of devices, according to an exemplary embodiment.

As illustrated in FIG. 12, the device 1200 (hereinafter, the transmission device) for improving QoE of the screen shared among a plurality of devices, according to the present embodiment, may include a controller 1250 and a memory 1260. However, not all of the illustrated components are essential components. The transmission device 1200 may be realized by more or less of the illustrated components.

FIG. 13 illustrates an example when the transmission device 1200 is a smartphone. However, as described above, a device may be embodied as various devices such as a PC, a smartphone, a tablet PC, and a TV.

A mobile communicator 1201 performs, for example, call setup and data communication with a base station via a cellular network such as a 3G/4G network. A sub communicator 1202 performs a function for short-distance communication such as Bluetooth or near field communication (NFC). A broadcasting receiver 1203 receives a digital multimedia broadcasting (DMB) signal.

A camera 1204 includes a lens and optical elements for capturing a photo or video.

A sensor 1205 may include a gravity sensor for sensing motion of the device 1200, an illumination sensor for sensing brightness of light, a proximity sensor for sensing proximity of a person, a motion sensor for sensing motion of a person, etc.

A global positioning system (GPS) receiver 1206 receives a GPS signal from a satellite. Various services may be provided to a user by using GPS signals.

An inputter/outputter (I/O) 1210 provides an interface with an external device or the user, and includes buttons 1211, a microphone 1212, a speaker 1213, a vibration motor 1214, a connector 1215, and a keypad 1216.

A touch screen 1218 receives a touch input of the user. Here, the touch input may be an input made due to a drag gesture or a tap gesture. A touch screen controller 1217 transmits, to a controller 1250, the touch input received by the touch screen 1218. A power supply 1219 is connected with a battery or an external power source to supply power to the device 1200.

The controller 1250 allows the device 1200 to function as a device for improving QoE, by executing programs stored in a memory 1260.

The programs stored in the memory 1260 may be classified into a plurality of modules according to their functions, for example, a mobile communication module 1261, a Wi-Fi module 1262, a Bluetooth module 1263, a DMB module 1264, a camera module 1265, a sensor module 1266, a GPS module 1267, a video player module 1268, an audio player module 1269, a power module 1270, a touch screen module 1271, a user interface (UI) module 1272, and a QoE control module 1273.

Functions of most of the modules would be instinctively understood by one of ordinary skill in the art in view of their names and thus only the QoE control module 1273 will be described here. When a screen is shared via a network among a plurality of devices, the QoE control module 1273 adjusts a parameter used to encode a screen image of the screen, based on a class of a content currently displayed on the screen.

In other words, the QoE control module 1273 includes commands for detecting a class of a content corresponding to an application currently displayed on the screen, determining a QoE policy appropriate to the detected class of the content, and adjusting a frame rate and resolution based on the determined QoE policy.

The application currently displayed on the screen may be detected based on a name of the application. The QoE control module 1273 may include an extractor for extracting name information of the application. If the extractor extracts the name information of the application currently displayed on the screen, the class of the content corresponding to the application may be detected by using a list stored in the memory 1260.

Also, if a plurality of devices share the screen via the network, the QoE control module 1273 analyzes a state of the network, determines an allowed bitrate based on a result of the analyzed state of the network, and adjusts the frame rate and resolution appropriately to the class of the content currently displayed on the screen, based on the determined allowed bitrate.

Exemplary Embodiments may be implemented in the form of a medium including computer-executable commands, e.g., a computer-executable program module. A computer-readable medium may be an arbitrary medium that may be accessed by a computer, and includes volatile and nonvolatile media, and detachable and non-detachable media. Also, the computer-readable medium may include a computer recording medium and a communication medium. The computer recording medium includes volatile and non-volatile media, and detachable and non-detachable media that are embodied by using an arbitrary method or technology for storing information such as a computer-readable command, a data structure, a program module, or other data. The communication medium typically includes a computer-readable command, a data structure, a program module, or other transmission mechanisms, and includes an arbitrary information transmission medium.

Exemplary embodiments may be embodied in many different forms and should not be construed as being limited to the foregoing exemplary embodiments. For example, a single component may be separated into a plural of components, and a plurality of components may be combined into one component.

While the foregoing exemplary embodiments been particularly shown and described, it will be understood by one of ordinary skill in the art that various changes in form and details may be made therein without departing from the spirit and scope of the inventive concept, as defined by the appended claims and their equivalents.

What is claimed is:

1. A method of controlling quality of experience (QoE) in a first device which shares a screen of the first device with a second device, the method comprising:
    detecting, by a controller, a class of a content currently displayed on the screen based on motion information of the content and a ratio of an area occupied by a text in the screen, wherein the text is identified by text recognition;
    determining, by the controller, a policy indicating desired levels of a resolution and a frame rate within a range of an allowable bitrate based on the detected class of the content, wherein the allowable bitrate is determined based on a state of a network used to share the screen among the first device and the second device;
    encoding, by the controller, a screen image of the first device based on the determined policy by adjusting the frame rate and the resolution used to encode the screen image of the screen, based on the determined allowable bitrate; and
    transmitting, by a communicator, the encoded screen image to the second device,
    wherein the adjusting of the frame rate and the resolution comprises adjusting a weight of the resolution to be higher than a weight of the frame rate according to the ratio of the area occupied by the text in the screen being equal to or greater than a threshold.

2. The method of claim 1, wherein the determining of the policy further comprises:
    increasing a level of the frame rate when a sum of motion vectors of the content is greater than a pre-determined value; and
    increasing a level of the resolution when the sum of motion vectors of the content is less than the pre-determined value.

3. The method of claim 1, wherein the detected class of the content is at least one from among a graphic content, a real image content, and a text content.

4. The method of claim 1, wherein the detecting is performed based on a name of a currently executed application.

5. A transmission device comprising:
    a processor executing instructions, stored in a memory to provide a controller configured to:
    detect a class of a content currently displayed on a screen based on motion information of the content and a ratio of an area occupied by a text in the screen, wherein the text is identified by text recognition,
    determine a policy indicating desired levels of a resolution and a frame rate within a range of an allowable bitrate based on the detected class of the content, wherein the allowable bitrate is determined based on a state of a network used to share the screen among the transmission device and a receiving device, and
    encode a screen image of the transmission device based on the determined policy by adjusting the frame rate and the resolution used to encode the screen image of the screen, based on the determined allowable bitrate; and
    a communicator configured to transmit the encoded screen image to the receiving device,
    wherein the controller is further configured to adjust a weight of the resolution to be higher than a weight of the frame rate according to the ratio of the area occupied by the text in the screen being equal to or greater than a threshold.

6. The transmission device of claim 5, wherein the controller is further configured to increase a level of the frame rate when a sum of motion vectors of the content is greater than a pre-determined value and increases a level of the resolution when the sum of motion vectors of the content is less than the pre-determined value.

7. The transmission device of claim 5, wherein the detected class of the content is at least one from among a graphic content, a real image content, and a text content.

8. The transmission device of claim 5, wherein the controller is further configured to detect the class of the content currently displayed on the screen further based on a name of a currently executed application.

9. A non-transitory computer-readable recording medium having embodied thereon a program executable by a computer for performing the method of claim 1.

10. A transmission device comprising:
    a display configured to display a screen image;
    a processor executing instructions stored in a memory to provide a controller configured to:
    determine a state of a network used to share the screen image,
    determine a policy indicating desired levels of a resolution and a frame rate within a range of an allowable bitrate for a content of the screen image which is currently displayed based on a class of the content detected based on motion information of the content and a ratio of an area occupied by a text in the screen image, wherein the text is identified by text recognition and the allowable bitrate is determined based on the state of the network used to share the screen image among the transmission device and a receiving device,
    determine a frame rate and a resolution based on the determined policy and the determined allowable bitrate,
    adjust a weight of the resolution to be higher than a weight of the frame rate according to the ratio of the area occupied by the text in the screen image being equal to or greater than a threshold, and
    encode the screen image according to the determined frame rate and the determined resolution based on the adjustment of the weight of the resolution; and
    a communicator configured to transmit the encoded screen image to the receiving device using the network.

11. The transmission device of claim 10, wherein the controller is further configured to determine the policy by determining a class of the content of the screen image.

12. The transmission device of claim 11, wherein the controller is further configured to increase a level of the frame rate when a sum of motion vectors of the content is greater than a pre-determined value and increase a level of the resolution when the sum of motion vectors of the content is less than the pre-determined value.

13. The transmission device of claim 10, the controller is further configured to determine the state of the network by determining a maximum bitrate for transmitting the encoded image.

* * * * *